Figure 1:
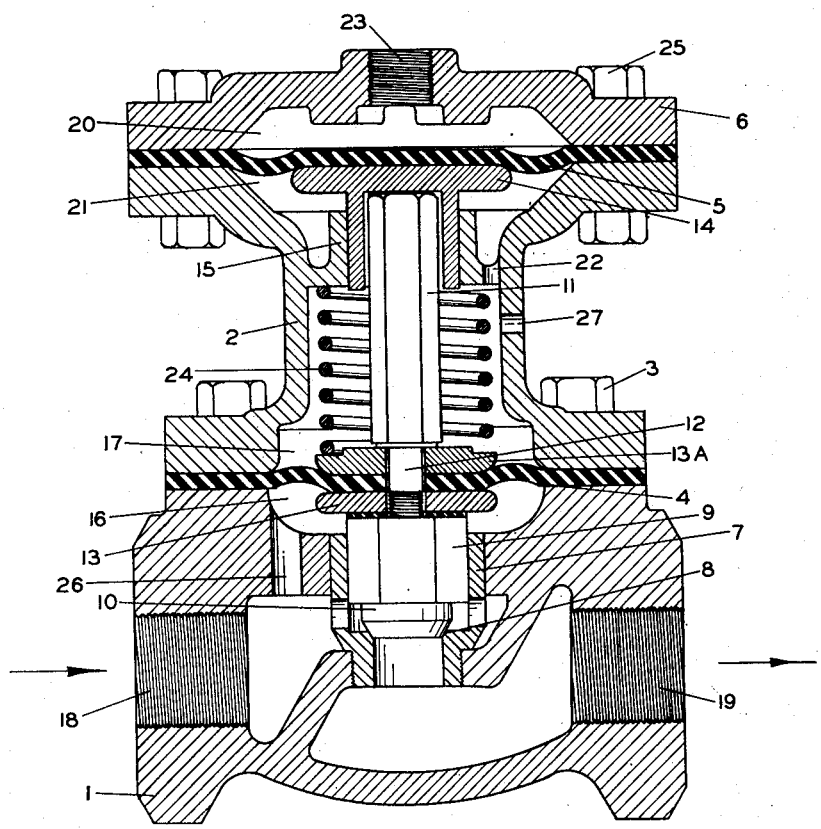

Sept. 14, 1943.　　　G. R. BENZ　　　2,329,323
RATIO REGULATOR
Filed June 26, 1941　　　2 Sheets-Sheet 1

INVENTOR
G. R. BENZ
BY
ATTORNEY

Patented Sept. 14, 1943

2,329,323

UNITED STATES PATENT OFFICE 2,329,323

RATIO REGULATOR

George R. Benz, Bartlesville, Okla., assignor to Phillips Petroleum Company, a corporation of Delaware Application June 26, 1941, Serial No. 399,899

3 Claims. (Cl. 62—1)

Liquefied gases and volatile liquids such as propane, butane and mixtures thereof are extensively marketed for consumption as motor and domestic fuels. These liquids which are extremely volatile are ordinarily stored under their own vapor pressure in suitable storage tanks either above-ground or under-ground from which they are pumped to disposal stations and fuel tanks or containers.

In metering and dispensing volatile liquids and liquefied gases in a liquid state, considerable difficulty is experienced in determining the true volume of the liquid dispensed. The piping and dispensing equipment as a rule is above-ground and exposed to atmospheric temperature conditions and has a relatively low heat capacity. Thus such equipment is exposed to relatively extreme temperatures in the summer months and attains a higher temperature than that prevailing in the storage tank. Liquefied petroleum gases of the above mentioned type have a very high vapor pressure even at ordinary atmospheric temperatures and during the summer months have a great tendency to partially vaporize upon contact with the higher temperature equipment.

In addition to the detrimental effects of vapors on the operation of pumps and other equipment employed in transferring the liquids from storage tanks, the presence of vapors in the meter results in the meter giving a false reading, and may in some instances cause gas lock and render the meter inoperative. It is thus of paramount importance for the satisfactory operation of a system such as above described that the hydrocarbons passing through the transfer lines between the storage tank and the disposal station be maintained in liquid condition and liquid meters such as those of the positive displacement type may be used for metering the volume of liquid dispensed if the pressure at which the liquid is measured exceeds the vapor pressure corresponding to the temperature at which the liquid is measured.

A number of methods have been previously proposed to regulate and control the pressure on the volatile liquids in the transfer lines, however, such methods have not been entirely satisfactory. In the system disclosed by Francis W. Wilcox in U. S. Patent No. 2,049,239, a system is described which includes a back pressure regulator located in the line between the meter and the disposal station and is adapted to restrict fluid flow in the line until the pressure has been built up to such a point as to prevent vaporization. This is accomplished by means of a valve in the line operable by a diaphragm maintained in closed position by vapor pressure in the tank on the top of the diaphragm plus the action of a coil spring. The under side of the diaphragm is subjected to the action of fluid from the discharge of the pump and fluid will flow through the transfer line when sufficient pressure is built up by the pump to overcome the vapor pressure in the tank plus the action of the coil spring. Of course, it would be necessary in a device of this type to employ a spring of such strength that will meet any atmospheric requirements within a relatively wide range of temperature change. In this case, a constant pressure differential exists between the discharge of the meter and vapor space in the tank. Thus at low temperatures the pump must develop as much pressure to overcome the action of the coil spring as at relatively high temperatures.

An object of this invention is to provide a device which will be of sufficient flexibility as to automatically adapt itself to any atmospheric conditions.

A further object of this invention is to provide a device which is relatively inexpensive, may be readily installed and effects saving in pump pressure under varying conditions.

A still further object of this invention is the provision of a regulator which will render the operation of transportation systems for volatile fuels more efficient in systems of the type above described.

This invention relates to a pressure regulator which is particularly adapted for use in transfer lines from volatile liquid storage tanks to disposal stations and where such lines are provided with meters for measuring the volume of liquid dispensed. It is particularly designed and effective for use in a system such as disclosed and described in the Benz et al. Patent No. 2,291,678, granted August 4, 1942. The device of this invention includes a valve which is interposed between the metering device and the disposal station which is likewise responsive to vapor pressure from the storage tank and fluid pressure on the discharge side of the pump. The arrangement is such that positive and invariable means are provided whereby calculated pressure ratio will always be necessary, regardless of temperature or atmospheric conditions to open the valve and allow liquid flow through the transfer line. The valve is normally held in closed position by a coil spring and the structure includes a multiple diaphragm arrangement operatively associated with a valve in such a way that the tank vapor pressure acts on a diaphragm of relatively large area, whereas the line pressure opposing the tank vapor pressure acts on a relatively smaller diaphragm so that at all times a higher pressure is necessary in a definite pressure ratio to cause the valve to open irrespective of change in the fluid vapor pressure.

Referring to Figure 1, the valve body is designated at 1, while 2 is a bonnet casing located above the valve body and secured thereto by means of bolts 3. A diaphragm 4 is clamped between the bonnet and the valve body and a second diaphragm 5 of larger size is clamped between the cover 6 and the bonnet by means of bolts 25. The relative size of the diaphragms determines the pressure increment necessary to open the valve at any given tank pressure. The valve body carries a valve cage 7 provided with a multi-sided bore for the reception of the guide nut 9 which enables accurate seating of the valve 10 on the valve seat 8. The valve is provided with a valve stem 11, the lower end of which terminates in a shank 12 to the end of which is screw threaded the guide nut, clamping the diaphragm to the valve stem through washers 13 and 13A. The valve stem is capped by a mushroom headed sleeve 14, the top surface of which operatively engages the under surface of the upper diaphragm. The interior of the valve bonnet has a restricted portion 15, forming a bearing surface for the mushroom sleeve, and at the same time provides a first casing in the lower part of the assembly which is divided into two chambers 16 and 17 by means of the diaphragm 4. The lower chamber 16 communicates through a passage 26 with the inlet and up-stream side 18 of the valve body. The opposite side of the valve body has an outlet 19 on the down-stream side of the valve. The upper chamber 17 communicates with the atmosphere through an opening 27 in the wall of the valve bonnet. The restricted portion of the bonnet also forms a second casing in the upper part of the assembly which is divided into two chambers 20 and 21 by the diaphragm 5. The lower chamber 21 communicates with the atmosphere through a passage 22 and opening 27, while the upper chamber 20 communicates with the vapor space of the storage tank through the opening 23. The valve is normally maintained in closed position by a coil spring 24, one end of which bears upon the lower part of the flange formed by the restricted portion of the bonnet, the other end bearing upon the lower diaphragm clamping washer 13A.

The coil spring 24 has an additive effect on the pressure increment necessary to open the valve determined by the difference in the size of diaphragms.

It is thus apparent that the valve will remain in closed position until sufficient pressure bearing on the under side of the lower diaphragm is built up in the line by the pump to overcome the combined effect of the storage tank vapor pressure on the top of the upper diaphragm and the coil spring.

Figure 2:
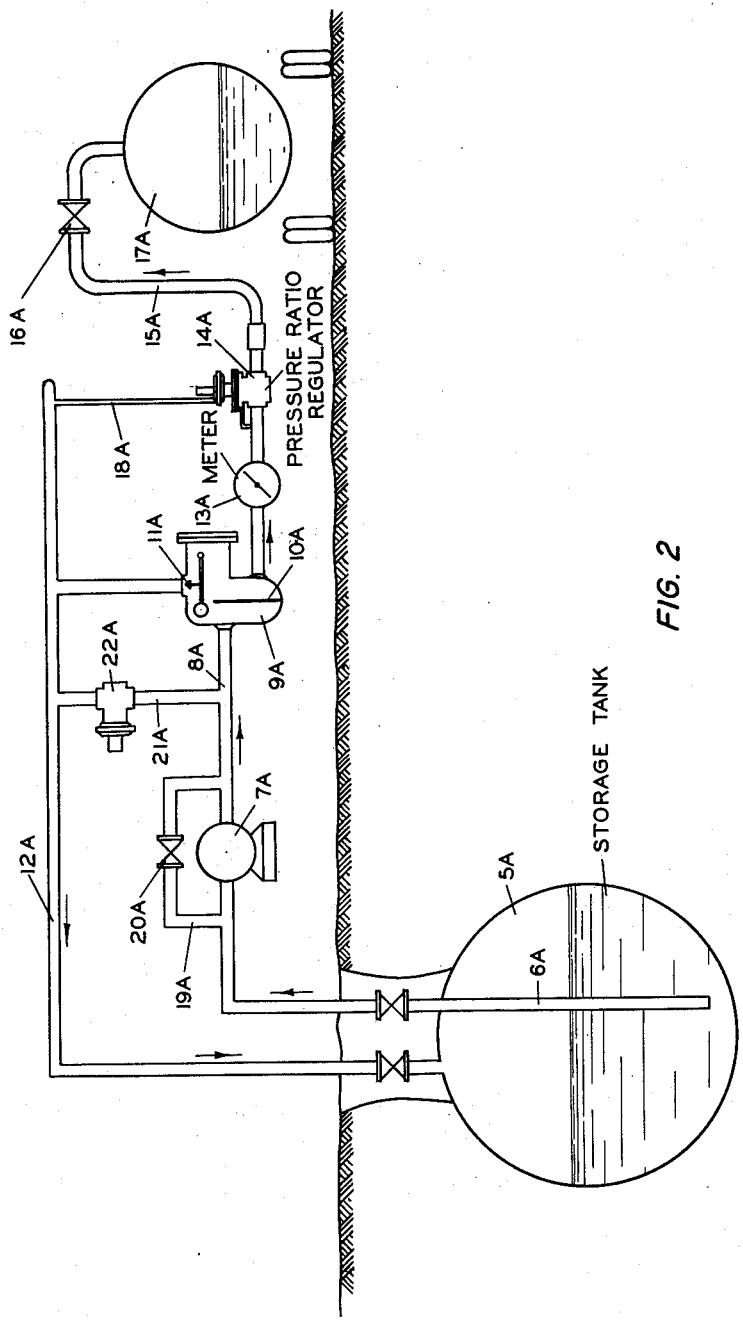

The device may be employed in a system illustrated diagrammatically in Figure 2 at 14A which system is subject matter of the Benz et al. application. The device may likewise be employed advantageously in place of the orifice or pressure ratio regulator shown in Figure 2 of the Benz et al. application.

In Figure 2 of the attached drawings, the numeral 5A designates a storage tank for storing volatile liquids such as liquefied gases, natural gasoline, liquefied petroleum gas, and the like. A liquid eduction pipe 6A in the lower portion of the storage tank provides an outlet for the liquid to be dispensed from the tank. A pump 7A of suitable capacity takes suction from the liquid eduction pipe 6A and discharges through the pipe 8A to a conventional gas trap 9A. The gas trap is provided with a baffle 10A and a float controlled valve 11A which opens to vent gases through the pipe 12A when the accumulation of gas in the gas trap is such that the liquid drops below a predetermined level. Any gas vented by the valve 11A is returned to the vapor space of the storage tank 5A through the pipe 12A. Obviously the gas trap may be omitted if desired.

Liquid passing the gas trap 9A flows through a suitable meter 13A for measurement. The meter is maintained at a pressure above the vapor pressure by the pressure ratio regulator 14A. Liquid measured in the meter 13A passes through the pressure ratio regulator 14A, the conduit 15A and the valve 16A to the receiving container 17A.

The pressure ratio regulator 14A is so constructed and arranged that the pressure maintained on the meter 13A is in definite ratio to the vapor pressure in the storage tank 6A. Communication is established between the pressure ratio regulator 14A and the storage tank 5A through the pipes 18A and 12A.

The pump 7A may be by-passed through the pipe 19A in which is a valve 20A to control the quantity of liquid by-passed. Fluid passing the pump 7A may be returned to the storage tank 5A through the pipe 21A interconencting the pipe 8A and the pipe 12A at a point intermediate the pump 7A and the meter 13A. A differential pressure regulator 22A of conventional design is interposed in the pipe 21A and acts as a relief valve for the pump when no liquid is being metered through the meter 13A. The differential pressure regulator 22A is set to allow fluid to pass through the pipe 21A when the pressure in the pipe 8A is in excess of that maintained on the meter by the pressure ratio regulator 14A. Either a pressure ratio regulator, a back pressure regulator, or a relief valve, set to open at a pressure higher than that maintained by the pressure ratio regulator 14A may be used in place of the differential pressure regulator 22A if desired.

By means of the arrangement provided by the present invention the pressure required for fluid flow through the transfer line is self regulatory. That is, in warm weather when tank vapor pressure and hence pressure on the upper side of the valve is highest, it will be necessary to develop a higher outlet pump pressure to open the valve and allow fluid flow through the transfer line. However, in relatively cold atmospheric conditions, the pressure above the valve will be considerably reduced and a corresponding smaller pressure necessary for fluid flow.

The advantages of this arrangement are obvious and provide a material advance in the art and efficiency in the operation of hydrocarbon liquid transfer systems where the liquid is highly volatile.

Having thus described my invention, I claim:

1. In a system for dispensing volatile liquids subjected to a considerable range of temperatures including a storage tank, a pump for transferring the liquid from the tank to a disposal station and a liquid meter, a pressure ratio regulator adapted to maintain a substantially constant pressure ratio throughout the temperature range between the pressure in the meter and the vapor pressure of the volatile liquid in the storage tank comprising a casing, a valve having a valve stem in said casing for controlling fluid flow from said meter to the disposal station, a first imperforate, movable partition in the casing associated with the valve stem and forming a chamber communicating with the upstream side of said valve, a second imperforate, movable partition of larger size in the casing associated with the valve stem and forming a chamber in communication with the vapor-containing portion of the storage tank.

2. In a system for dispensing volatile liquids subjected to a considerable range of temperatures including a storage tank, a pump for transferring the liquid from the tank to a disposal station and a liquid meter, a pressure ratio regulator adapted to maintain a substantially constant pressure ratio throughout the temperature range between the pressure in the meter and the vapor pressure of the volatile liquid in the storage tank comprising a casing, a valve having a valve stem in said casing, a first imperforate, movable partition in the casing associated with the valve stem and forming a chamber under the partition communicating with the upstream side of said valve, a second imperforate, movable partition of larger size in the casing associated with the valve stem and forming a chamber over the partition communicating with the vapor-containing portion of the storage tank.

3. In a system for dispensing volatile liquids subjected to a considerable range of temperatures including a storage tank, a pump for transferring the liquid from the tank to a disposal station and a liquid meter, a pressure ratio regulator adapted to maintain a substantially constant pressure ratio throughout the temperature range between the pressure in the meter and the vapor pressure of the volatile liquid in the storage tank comprising a casing, a valve having a valve stem in said casing, a diaphragm in the casing associated with the valve stem and forming a chamber under the diaphragm communicating with the upstream side of said valve, a second diaphragm of larger size in the casing associated with the valve stem and forming a chamber over the partition in communication with the vapor-containing portion of the storage tank and spring means urging the valve into closed position.

GEORGE R. BENZ.